J. N. PEPIN.
TALKING MACHINE.
APPLICATION FILED FEB. 26, 1921.

1,437,192.

Patented Nov. 28, 1922.
4 SHEETS—SHEET 1.

Witnesses:
W. F. Kilroy
Harry B. White

Inventor:
Joseph N. Pepin,
By Hie & Hie
Attys.

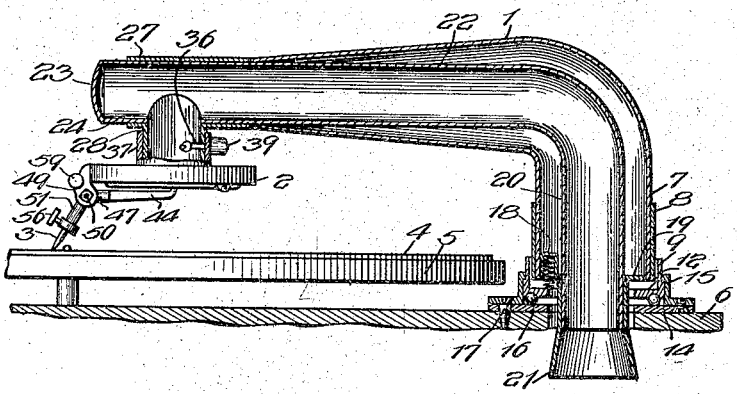
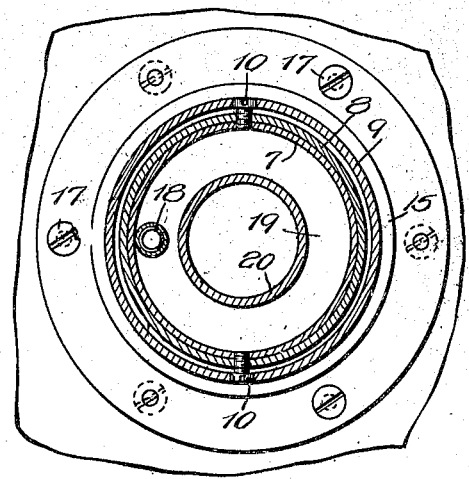
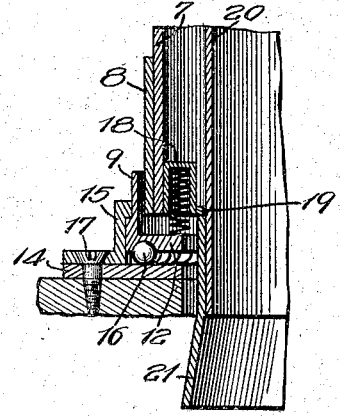
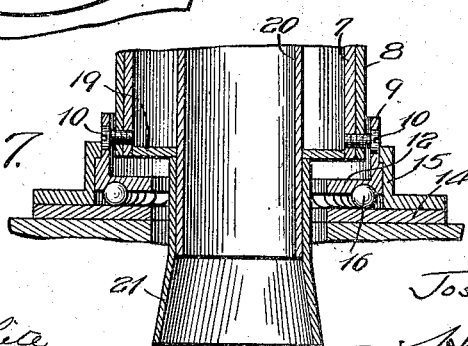

J. N. PEPIN.
TALKING MACHINE.
APPLICATION FILED FEB. 26, 1921.

1,437,192.

Patented Nov. 28, 1922.
4 SHEETS—SHEET 3.

Witnesses:
W. F. Kilroy
Harry R. L. White

Inventor:
Joseph N. Pepin
By Alice & Alice
Attys.

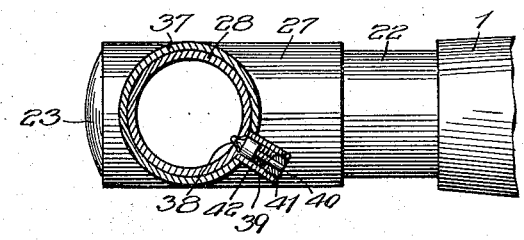
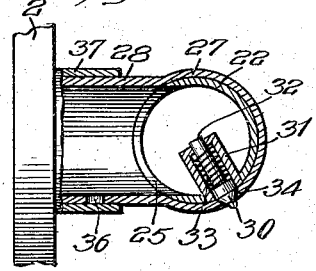
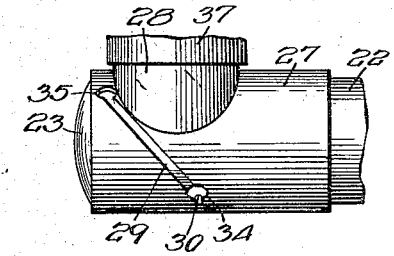
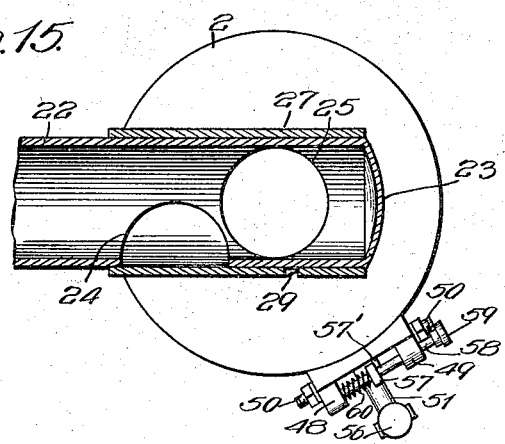

Patented Nov. 28, 1922.

1,437,192

UNITED STATES PATENT OFFICE.

JOSEPH N. PEPIN, OF CHICAGO, ILLINOIS, ASSIGNOR OF ONE-HALF TO W. H. THOMMEN, OF PLYMOUTH, WISCONSIN.

TALKING MACHINE.

Application filed February 26, 1921. Serial No. 447,986.

*To all whom it may concern:*

Be it known that I, JOSEPH N. PEPIN, a citizen of the United States, residing at Chicago, in the county of Cook and State of Illinois, have invented certain new and useful Improvements in Talking Machines, of which the following is a description.

My invention belongs to that general class of devices known as talking machines, and relates particularly to an improved tone arm, sound box, stylus bar and associated parts. The invention has among its objects the production of a device of the kind described that is simple, efficient, convenient, attractive, compact, durable and satisfactory for use wherever found applicable. The invention has among its further objects the production of a machine adapted to use records formed with a lateral cut or records produced with a vertical or "hill and dale" cut, the sound box and stylus being easily and quickly adjustable for playing either type of record without removing the same from the tone arm, and without in any way impairing the efficiency or tone of the instrument. Many other objects and advantages of the construction herein shown and described will be obvious to those skilled in the art from the disclosure herein made.

To this end my invention consists of the novel construction, arrangement and combination of parts herein shown and described, and more particularly pointed out in the claims.

In the drawings, wherein like reference characters indicate like or corresponding parts, Figure 1 is a side elevation of my improved mechanism adjusted for lateral cut records;

Fig. 4 is a vertical sectional view through the tone arm, with the sound box and stylus adjusted for vertical cut records;

Fig. 5 is an enlarged view of a portion of the same, showing a method of attaching the tone arm to a suitable base;

Fig. 6 is a sectional view taken substantially on line 6—6 of Fig. 1;

Fig. 7 is a sectional view taken substantially on line 7—7 of Fig. 1;

Fig. 12 is a sectional view taken substantially on line 12—12 of Fig. 2;

Fig. 13 is a sectional view taken substantially on line 13—13 of Fig. 2;

Fig. 14 is a plan view of the under side of the same; and

Fig. 15 is a sectional view taken substantially on line 15—15 of Fig. 2.

Figure 1:
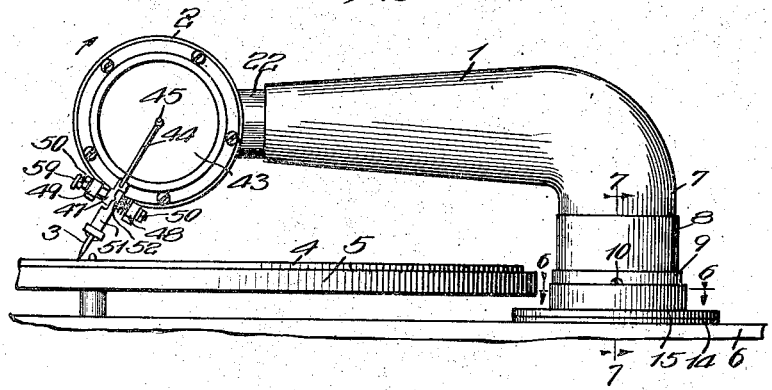
Figure 2:
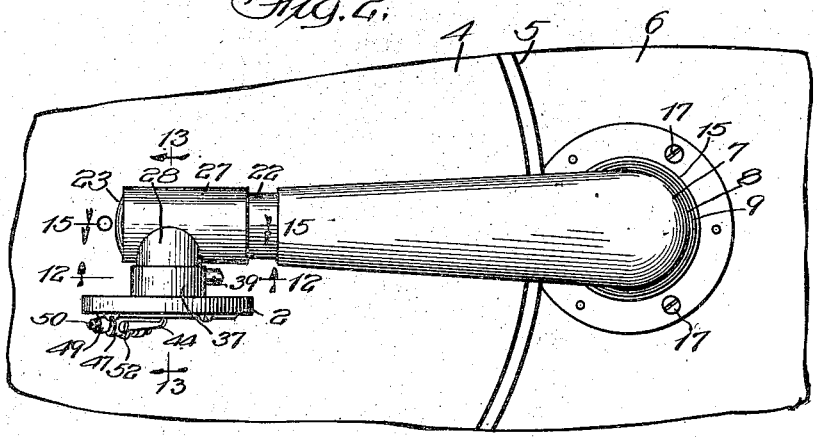
Fig. 2 is a top plan view of the same.

Referring to the drawings, wherein only the preferred embodiment of my invention is shown, the mechanism illustrated consists of the tone arm casing or support 1, the tone arm 22 itself being carried thereby as hereinafter described, the sound box 2 connected with the tone arm, and to which is attached or which carries the needle or stylus 3 and associated parts, arranged to cooperate with a record of the desired type. I have illustrated a disk record 4 mounted on the usual rotatable carrier 5, it being understood, however, that the particular carrier mechanism and style of record to be produced or reproduced forms no part of the present invention, as any suitable equivalent mechanism or parts may be employed. The tone arm casing or support 1 is mounted on any suitable support such as a base or cabinet part 6, preferably so that the same may be adjustable.

Referring particularly to Figs. 4 to 7, the complete tone arm preferably consists of an outer shell 1, which is turned or bent down as indicated at 7, which constitutes the base, the outer shell tapering gradually if desired from the base to the outer end. I have shown the base portion provided with a reinforcing sleeve 8, which may be secured thereto in any suitable manner. The particular type of tone arm illustrated is arranged to swivel or pivot so that the free end of the arm may be turned or swung laterally on a vertical axis, and the same is also arranged to provide a pivotal movement, whereby the free end has a limited vertical movement.

A very satisfactory construction consists of a sleeve 9, to which the lower end of the arm or base end is pivotally secured by means of screws 10 or the equivalent, part 9 being mounted to turn on a base part 14. As shown, part 9 is formed with an internally extending flange 12, and is maintained in place on the base 14 by means of a collar 15 constructed to interengage therewith, the collar and base portions 14 and 15 being suitably secured to the base 6 by screws 17 or their equivalents for the purpose. In order to reduce friction as much as possible so that the arm may be easily swung or turned, I preferably provide the ball bearings 16 arranged substantially as shown between the annular flange 12 and the base plate 14. Obviously, any equivalent antifriction bearings may be employed for the purpose. As most clearly shown in Fig. 5, I prefer to provide a spring 18 between the plate 19 at the lower or base end of the arm and the flange portion 12, which spring or its equivalent will tend to yieldingly support or balance the arm, so that its outer or free end is maintained substantially as shown in Fig. 1. However, a slight play is possible when the mechanism is in operation. Obviously, the stylus may be lifted over and off the record by slightly tilting or lifting the free end of the tone arm upwardly about the pivots or screws 10, and thence swinging the same laterally. In turning the same back and over in engagement with the record, however, the spring 18 acts to a certain extent as a shock absorber, as well as supporting the free end of the tone arm when the stylus is resting upon the record, that is to say, it substantially balances the weight of the free end of the arm and sound box, thereby reducing the wear on the record and the stylus.

As most clearly shown in Fig. 7, the lower end of the arm is provided with the extending plate or annular ring 19, through which extends the tubular tone arm inner shell or casing 22, the lower end 20 of which projects through the flange and is arranged to cooperate with the sleeve 21, which is in communication with the tone chamber. As most clearly illustrated in Fig. 4, the inner shell or casing 22 projects beyond the outer or free end of the outer sleeve or casing part 1, and it will be noted that the sleeve 22 and its extending part 20 is of the same diameter throughout its entire length. The dead air space between the sleeves 1 and 22 to a certain extent acts as an insulation, and in this connection the air may be exhausted from the space if desired. I close the outer end of the sleeve 22 as indicated at 23, there being provided one or more openings 24—25 therethrough in the side walls. As was before mentioned, the particular device illustrated is designed to play two different types of records, consequently in this instance I provide two holes and arrange the sound box thereon so that either opening may be brought into registry with the chamber in the sound box.

Referring particularly to Figs. 12 to 15, the free end of the portion 22 of the tone arm carries a sleeve 27 provided with an extending tubular portion 28 arranged to register with either of the openings 24 or 25, as desired, the extending portion 28 adjustably carrying the sound box as will be hereinafter described. The sleeve 27 shown has both a sliding and a turning movement on the portion 22, its limit of travel being limited as well as the particular direction of its movement, in any desired manner. As shown, I provide a slot 29 which extends substantially spirally in the sleeve 27, and which is provided with enlarged ends 34 and 35, as will be hereinafter described. Carried by the portion 22 is a stop or guide member 30, arranged to cooperate with the slot 29. As shown, member 30 is in the form of a plunger, which is movable in the sleeve 31, the inner end of the plunger projecting through the sleeve so as to be guided in its movement. Normally the plunger is maintained in the position shown in Fig. 13 by a spring 33 or equivalent means for the purpose. It will be noted that the member 30 is formed with a substantially tapering end so that when the sleeve is in the position whereby the plunger is at either end of its travel in the slot 29, the spring will force the same outwardly and substantially lock the sleeve against accidental rotation, inasmuch as the enlarged portions will fit into the end portions of the slot. However, upon exerting a little pressure on the sleeve and turning the same, the tapering portion of the plunger or detent acting substantially as a cam, first will cause the plunger to be retracted with only the extreme reduced portion projecting in the slot to guide the sleeve in its rotation. Thus, not only is the sleeve locked in place on the part 22 and the movement of the sleeve governed by the slot and pin connection shown, but in its two extreme positions the same is yieldably locked in position. I prefer to so design the parts that the sleeve 27 will abut against the outer end of the arm portion 1 when in one position, as most clearly shown in Fig. 4.

As before mentioned, the sound box 2, which may be substantially of standard construction, is provided with the tubular sleeve or flange portion 37 arranged to engage on the extending portion 28 of the sleeve 27, the construction being such that the sound box may be partially rotated to bring it into a desired position, as indicated in Figs. 1 and 4, so as to vary the position of the stylus, which is in itself adjustable, as will be hereinafter described, when the sleeve is turned. I provide a similar slot and pin construction or its equivalent for locking the sound box in the desired position on the extended portion 28, and yieldingly maintaining it against accidental displacement. In this case the extended part 28 or sleeve 27 is formed with a slot 36 of the desired size and shape, which is also preferably enlarged at the ends. Carried by the portion 37 is a plunger 38 or detent, the same being arranged in the casing part 39 and normally maintained in position by a spring 40. In this instance the plunger is provided with a stem 42 arranged to project through a nut 41. Obviously, adjusting the nut 41 will vary the tension of the spring 40, thereby permitting an adjustment of the locking mechanism. The sound box may be turned as indicated in Fig. 1 when the sleeve 27 is in its outward position, or as shown in Fig. 4.

Figure 8:
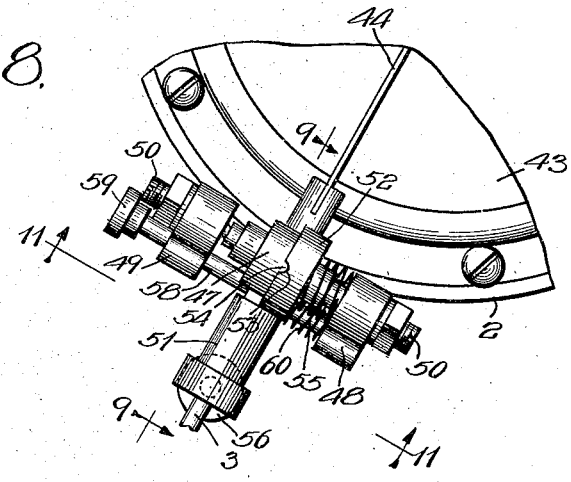
Fig. 8 is an enlarged view of a portion of the sound box and stylus adjusted as shown in Fig. 1.

It is desirable, in addition to the adjustments referred to, to so make the mechanism that the stylus or needle 3 may be brought into engagement with the record substantially as indicated in Figs. 1 or 4, and in order to permit this, I provide an adjustment on the stylus bar whereby the position of the stylus may be varied as the parts are adjusted. Referring particularly to Figs. 8 to 11, and first to Fig. 8, 43 represents the diaphragm of the sound box and 44 a part of the stylus bar, which in the construction shown is operatively brought into contact or connected with the diaphragm as indicated at 45 in the usual construction. The bar part 44 is preferably provided with a portion 47, which is suitably supported at one side of the sound box and provided with an adjustable extending part 51, constructed to carry the stylus or needle 3. As shown, the sound box is provided with one or more lugs 48—49, which carry pins 50 arranged to engage and support the portion 47 of the bar. The construction is preferably such that a very fine or needle-point contact is made between the supports and the part 47, so that the device is extremely sensitive, there being practically no friction. As shown, the extending bar part 51 is provided with an inner end 52 arranged to cooperate with the part 47, the two forming substantially a clutch mechanism. The part 52 is pivotally mounted on the projecting part 47' of the part 47, the two parts being arranged to interengage at the different operative adjustments so that to all intents and purposes the result is the same as if a one-part rigid stylus bar were employed. As shown, one part, part 52, is provided with one or more recesses 53, and the other part, part 47, with the detents 54 arranged to seat in the recesses. The parts are maintained in operative engagement in the desired position by a spring 55 or the equivalent. With this construction, part 51 may be turned to the position shown in Fig. 1 or the position shown in Fig. 4 and operatively maintained in that position so that the vibrations are efficiently transmitted from the needle to the diaphragm. It will be seen that the same constitutes substantially a clutch mechanism, by means of which the parts are held in rigid relationship.

Figure 10:
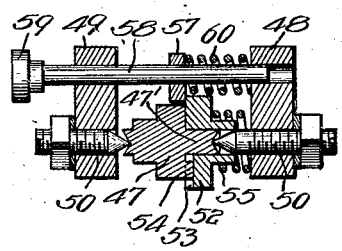
Fig. 10 is a sectional view taken substantially on line 10—10 of Fig. 9.
Figure 11:
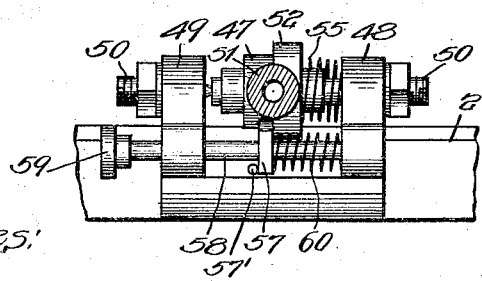
Fig. 11 is a sectional view taken substantially on line 11—11 of Fig. 8.

In order to move the parts out of engagement so that part 51 may be conveniently turned without strain, I provide a member 57 mounted on a rod 58, which is provided with a thumb or finger piece 59, for convenience in operation. A spring 60 normally maintains member 57, as shown in Fig. 10, against the stop 57', as well as to retrieve the same after the member is operated to move the stylus bar parts out of operative engagement at the time of adjusting the same. The needle 3 may be secured in the socket in the bar part 51 by a small thumb screw 56, or any equivalent means for the purpose. It may be mentioned that any preferred type of needle may be used.

The operation of my device may be briefly described as follows: Assuming that the parts are substantially in the positions as shown in Fig. 1, that is to say so adjusted as to cooperate with lateral cut records, of which there are a number of different makes at the present time on the market. In this case, as the record is rotated in the usual manner, the needle has a movement laterally, which is transmitted through the stylus bar parts 51, 47 and 44 to the diaphragm 43. As the needle travels in the various cuts of the record, the arm proper may be swung about its base in the usual manner.

Figure 3:
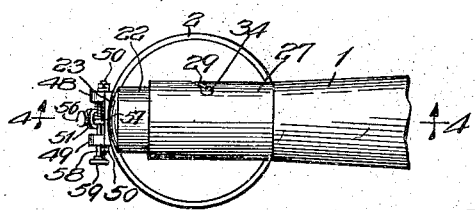
Fig. 3 is a top plan view of a portion of the same, with the sound box and stylus adjusted for vertical cut records.
Figure 9:
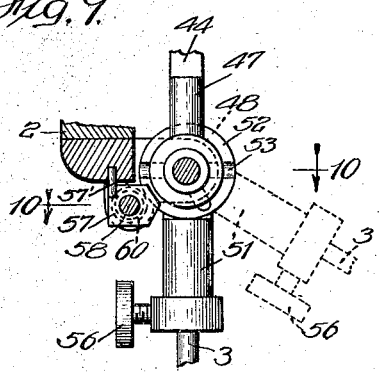
Fig. 9 is a sectional view taken substantially on line 9—9 of Fig. 8.

When it is desired to play a vertical cut, or as it is sometimes called a "hill and dale" record, of which there are several makes on the market, the operator moves the bar 58, thereby disengaging the clutch or stylus bar parts 47 and 52, so that part 52 may be swung upon its pivotal support or part 47, to the position shown in Fig. 4 or in the dotted lines in Fig. 9. As soon as it is in this position, the pressure on the bar 58 is released, spring 55 retrieving the part 52 and bringing the same into operative engagement with part 47, so that the stylus bar parts 51, 47 and 44 are subtsantially positively connected or rigid, the same being adjusted as shown in Fig. 4. The sound box 2 is turned on the projecting part 28 in the direction indicated by the arrow in Fig. 1 so that the same substantially takes the position shown in Fig. 4, as well as Fig. 3. The entire sound box and sleeve 27 are also turned on the projecting end 22 of the tone arm so that the mechanism is turned as shown in Figs. 3 and 4. When in this adjustment, the vertical cut records as previously described, may be efficiently and satisfactorily played.

It will be noted from the preceding description that the device is substantially compact and simple, as well as extremely rigid when in one adjusted position or the other. The same is adjustable at the base of the tone arm, and the sound box has a plurality of adjustments on the outer end of the tone arm, while the stylus has an adjustment as required. There are no loose parts to take off and turn around and replace by other parts, nor is any careful setting or positioning of the parts required. Merely giving the sound box the double turn on the tone arm and adjusting the stylus bar makes the device immediately adapted for either of the types of records referred to. The device is economical to manufacture. I prefer to make the inner sleeve or tone arm 22 substantially of uniform diameter or capacity throughout its length, the outer sleeve 1 being provided merely as a reinforcement which will have a tendency to prevent bending of the arm 22. The sleeve portion 21, while it may be made straight, is preferably slightly flared at the extreme lower end in order to overlie the conduit from the sound chamber of the machine at all times, as the arm may move vertically about the pivot pins 10, as has been previously described.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a sound box comprising a casing, a diaphragm, a stylus bar comprising an arm pivotally supported on said casing, and a stylus-bearing arm mounted so as to be rotatable about said first pivotal axis both of said arms having cooperating interengaging axially opposed faces whereby said stylus-bearing arm may be positioned at a desired angle relative to said stationary arm, and means for yieldably holding said cooperating arms in interengagement.

2. In a device of the kind described and in combination, a sound box comprising a casing, a diaphragm, a stylus bar comprising an arm pivotally supported on the casing and engaging said diaphragm, and a stylus-bearing arm rotatable about said first named pivotal axis, said stylus arm portions having cooperating interengaging detents, and yieldable means for locking said arms in adjusted positions.

3. In a device of the kind described and in combination, a sound box comprising a casing, a diaphragm, a stylus bar pivotally mounted on said casing comprising two parts, one of which is connected to said diaphragm and the other of which is movable longitudinally and angularly of said pivotal axis, means whereby said stylus bar parts may be adjustably locked together, and means for releasing said locked parts, said means comprising a rod carried by said lugs and engageable with said stylus bearing arm to disengage it from the relatively stationary arm.

4. In a device of the kind described and in combination, a sound box comprising a casing having spaced lugs thereon, a diaphragm, a stylus bar mounted on said casing and pivotally supported between said lugs, said stylus bar comprising two parts, one of which is connected to said diaphragm and the other of which is movable longitudinally and angularly of said pivotal axis, means whereby said stylus bar parts may be adjustably locked together, and means for releasing said locked parts, said means comprising a rod carried by said lugs and engageable with said stylus bearing arm to disengage it from the relatively stationary arm.

5. In a device of the kind described and in combination, a sound box comprising a casing having spaced lugs thereon, a diaphragm, a stylus bar mounted on said casing and pivotally supported between said lugs, said stylus bar comprising two parts, one of which is connected to said diaphragm and the other of which is movable longitudinally and angularly of said pivotal axis, means whereby said stylus bar parts may be adjustably locked together, and means for releasing said locking of the parts, said last mentioned means comprising a rod carried by said lugs and operatively engageable with said second mentioned arm to disengage it from the first mentioned arm, means for yieldably maintaining said last mentioned means normally out of engagement with said second mentioned arm, and a stop for limiting the movement of said disengaging means in one direction.

6. In a sound box, a stylus bar comprising a pivotally supported arm and a stylus bearing arm pivotally supported on said arm and angularly adjustable relative thereto, interengaging means for positioning said arms in predetermined adjusted positions, spring means for yieldably holding said arms in said positions and means for releasing said arms from their adjusted interengagment.

In testimony whereof, I have hereunto signed my name in the presence of two subscribing witnesses.

JOSEPH N. PEPIN.

Witnesses:
ROY W. HILL,
BERTHA HARTMANN.